United States Patent
Liao (10) Patent No.: US 9,413,161 B2
(45) Date of Patent: Aug. 9, 2016

(54) PROTECTION APPARATUS AND METHOD OF TERMINAL

(71) Applicant: ZTE Corporation, Shenzhen, Guangdong (CN)

(72) Inventor: Pinzhen Liao, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/895,461

(22) PCT Filed: Sep. 5, 2013

(86) PCT No.: PCT/CN2013/083019
§ 371 (c)(1),
(2) Date: Dec. 2, 2015

(87) PCT Pub. No.: WO2014/205912
PCT Pub. Date: Dec. 31, 2014

(65) Prior Publication Data
US 2016/0126722 A1  May 5, 2016

(30) Foreign Application Priority Data

Jun. 24, 2013 (CN) .......................... 2013 1 0253865

(51) Int. Cl.
*H02H 3/00* (2006.01)
*H02H 5/04* (2006.01)
(Continued)

(52) U.S. Cl.
CPC ................. *H02H 5/041* (2013.01); *H02H 3/08* (2013.01); *H02H 5/08* (2013.01); *H04B 1/3827* (2013.01);
(Continued)

(58) Field of Classification Search
USPC ........................... 361/86–87, 93.7–93.9, 91.1
See application file for complete search history.

(56) References Cited

U.S. PATENT DOCUMENTS

| 5,124,679 A | 6/1992 | Kanazawa |
| 5,818,122 A * | 10/1998 | Miyazawa ............. B60K 28/14 180/282 |

(Continued)

FOREIGN PATENT DOCUMENTS

| CN | 1767311 A | 5/2006 |
| CN | 103077360 A | 5/2013 |

(Continued)

OTHER PUBLICATIONS

International Search Report in international application No. PCT/CN2013/083019, mailed on Apr. 3, 2014.
(Continued)

*Primary Examiner* — Danny Nguyen
(74) *Attorney, Agent, or Firm* — Oppedahl Patent Law Firm LLC (57) ABSTRACT

A protection apparatus of a terminal is described in an embodiment of the disclosure, which includes that: a detection module, a driving module and a plugboard, wherein the plugboard is disposed between a mainboard side power supply contact and a battery side power supply contact of the terminal; the mainboard side power supply contact and the battery side power supply contact are connected via the plugboard; the detection module is configured to send a driving instruction to the driving module when detecting that a working parameter of the terminal exceeds a preset threshold; the driving module is configured to push the plugboard so as to break a connection between the mainboard side power supply contact and the battery side power supply contact when receiving the driving instruction sent from the detection module. A protection method of a terminal is also described in an embodiment of the disclosure. With the technical solution in the embodiment of the disclosure, it is able to realize a fast power interruption on a mobile terminal, effectively reduce the damage to the mobile terminal in an emergency and reduce the loss of a user.

10 Claims, 5 Drawing Sheets

(51) Int. Cl.
- *H04M 1/02* (2006.01)
- *H02H 3/08* (2006.01)
- *H02H 5/08* (2006.01)
- *H04B 1/3827* (2015.01)
- *H04M 1/18* (2006.01)
- *H02H 3/087* (2006.01)
- *H01M 2/34* (2006.01)

(52) U.S. Cl.
CPC .............. *H04M 1/0202* (2013.01); *H04M 1/18* (2013.01); *H01M 2/348* (2013.01); *H02H 3/087* (2013.01); *H04M 1/0262* (2013.01); *H04M 1/0277* (2013.01); *H04M 2250/12* (2013.01)

(56) References Cited

U.S. PATENT DOCUMENTS

| | | |
|---|---|---|
| 7,719,237 B2 | 5/2010 | Roh |
| 2006/0076932 A1 | 4/2006 | Roh |
| 2008/0142344 A1* | 6/2008 | Hickam ............. H01R 13/6616 200/51.1 |
| 2010/0103566 A1 | 4/2010 | Chen |
| 2013/0127261 A1* | 5/2013 | Kagawa ............... H01R 13/707 307/125 |

FOREIGN PATENT DOCUMENTS

| | | |
|---|---|---|
| JP | H09197501 A | 7/1997 |
| JP | 3776896 B2 | 5/2006 |
| KR | 20040098677 A | 11/2004 |

OTHER PUBLICATIONS

English Translation of the Written Opinion of the International Search Authority in international application No. PCT/CN2013/083019, mailed on Apr. 3, 2014.

Supplementary European Search Report in European application No. 13888149.5, mailed on Jun. 7, 2016.

* cited by examiner

PROTECTION APPARATUS AND METHOD OF TERMINAL

TECHNICAL FIELD

The disclosure relates to the technology of terminal protection, and in particular to a protection apparatus of a terminal and a protection method of a terminal.

BACKGROUND

At present, more and more mobile terminals are tending to be designed integrated with batteries, that is, the battery is undetachable; once the mobile terminal falls into water, or has an abnormal temperature, a crash fault, an internal circuit short or other emergencies, it is impossible to realize a fast power interruption to minimize the damage to the mobile terminal; even if the battery is detachable, battery cannot be removed rapidly in emergencies and unrecoverable damages will be caused.

To realize a fast power interruption on a mobile terminal, a patent application entitled "A method and an apparatus for protecting a mobile terminal" which is published on 1, May, 2013 and of which the publication patent number is CN103077360A proposes a method for fast power interruption, including: detecting humidity of the mobile terminal through a humidity sensor, powering off the mobile terminal when the humidity detected by the humidity sensor reaches a threshold. However, this method only monitors the humidity of the mobile terminal, without monitoring temperature and other emergencies such as abnormal internal circuit; moreover, this method powers off the mobile terminal by software; once the occurrence of crash fault or abnormal internal circuit leads to incapability of poweroff, fast power interruption cannot be implemented eventually to protect the mobile terminal.

SUMMARY

In view of the above, embodiments of the disclosure aim at providing a protection apparatus of a terminal and a protection method of a terminal, which can realize a fast power interruption on a mobile terminal, effectively reduce the damage to the mobile terminal in an emergency and reduce the loss of a user.

To this end, the technical solution of the embodiment of the disclosure is realized as follows.

The disclosure provides a protection apparatus of a terminal, including: a detection module, a driving module and a plugboard, wherein the plugboard is disposed between a mainboard side power supply contact and a battery side power supply contact of the terminal; the mainboard side power supply contact and the battery side power supply contact are connected via the plugboard; wherein the detection module is configured to send a driving instruction to the driving module when detecting that a working parameter of the terminal exceeds a preset threshold; and the driving module is configured to push the plugboard so as to break a connection between the mainboard side power supply contact and the battery side power supply contact when receiving the driving instruction sent from the detection module.

Preferably, a conductive strip may be disposed on the plugboard; when the plugboard is not pushed, the battery side power supply contact may be electrically connected with the mainboard side power supply contact via the conductive strip.

Preferably, all parts of the plugboard except the conductive strip may be made of an insulated material; when the plugboard is pushed, the battery side power supply contact and the mainboard side power supply contact may be isolated via the insulated material of the plugboard.

Preferably, when the plugboard is pushed, the battery side power supply contact and the mainboard side power supply contact may be in air isolation.

Preferably, the protection apparatus may further include: a baffle disposed on the terminal, wherein the baffle is configured to keep the plugboard inside the terminal when the plugboard is being pushed.

Preferably, the working parameter may include at least one of the following: a humidity value, a temperature value and a current value.

An embodiment of the disclosure also provides a protection method of a terminal based on the protection apparatus described above, including: when a detection module detects that a working parameter of the terminal exceeds a preset threshold, sending, by the detection module, a driving module a driving instruction for pushing a plugboard so as to break a connection between a mainboard side power supply contact and a battery side power supply contact.

Preferably, the protection method may further include: when the plugboard is not pushed, electrically connecting the battery side power supply contact with the mainboard side power supply contact via a conductive strip disposed on the plugboard.

Preferably, the breaking the connection between the mainboard side power supply contact and the battery side power supply contact may include:

pushing the plugboard by the driving module, so as to isolate the battery side power supply contact from the mainboard side power supply contact via an insulated material of the plugboard other than the conductive strip, thereby to break the connection between the mainboard side power supply contact and the battery side power supply contact.

Preferably, the breaking the connection between the mainboard side power supply contact and the battery side power supply contact may include:

pushing the plugboard by the driving module, so that the battery side power supply contact and the mainboard side power supply contact are in air isolation, thereby to break the connection between the mainboard side power supply contact and the battery side power supply contact.

The embodiment of the disclosure provides a protection apparatus of a terminal and a protection method of a terminal; the apparatus includes: a detection module, a driving module and a plugboard, wherein the plugboard is disposed between a mainboard side power supply contact and a battery side power supply contact of the terminal; the mainboard side power supply contact and the battery side power supply contact are connected via the plugboard; the detection module is configured to send a driving instruction to the driving module when detecting that a working parameter of the terminal exceeds a preset threshold; the driving module is configured to push the plugboard so as to break a connection between the mainboard side power supply contact and the battery side power supply contact when receiving the driving instruction sent from the detection module. In this way, the disclosure on one hand realizes the fast power interruption of a mobile terminal in emergencies by a physical method, effectively reduces the damage to the mobile terminal in an emergency and reduces the loss of a user; and on the other hand the disclosure can realize the fast power interruption of a mobile terminal manually, so as to rapidly cut off power supply when

DETAILED DESCRIPTION

The disclosure is described below in further detail in conjunction with the accompanying drawings and specific embodiments.

Figure 1:
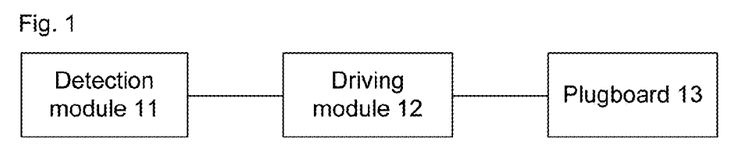
FIG. 1 is a structure diagram of a protection apparatus of a terminal according to Embodiment 1 of the disclosure.

FIG. 1 is a structure diagram of a protection apparatus of a terminal according to Embodiment 1 of the disclosure; as shown in FIG. 1, the protection apparatus includes: a detection module 11, a driving module 12 and a plugboard 13, wherein the plugboard 13 is disposed between a mainboard side power supply contact and a battery side power supply contact of the terminal; the mainboard side power supply contact and the battery side power supply contact are connected via the plugboard 13;

the detection module 11 is configured to detect a working parameter of the mobile terminal and to send a driving instruction to the driving module 12 when the working parameter exceeds a preset threshold, wherein the working parameter includes at least one of the following: a humidity value, a temperature value and a current value; and the driving module 12 is configured to push the plugboard 13 so as to break a connection between the mainboard side power supply contact and the battery side power supply contact when receiving the driving instruction sent from the detection module 11.

The detection module 11 can detect the humidity value of the mobile terminal via a humidity sensor, detect the temperature value of the mobile terminal via a temperature sensor, and detect a working current value of an internal circuit of the mobile terminal via a current sensor.

The working parameter exceeding a preset threshold specifically refers that:

the humidity value exceeds a preset maximum humidity value;

the temperature value exceeds a preset maximum temperature value or lowers than a preset minimum temperature value; and the working current value exceeds a preset maximum working current value.

The driving module 12 can push the plugboard employing a motor or a step motor.

Preferably, one end of the plugboard 13 is disposed on a side of the terminal, for being manually pulled out to break the connection between the mainboard side power supply contact and the battery side power supply contact.

Preferably, a conductive strip is disposed on the plugboard 13; when the plugboard 13 is not pushed, the battery side power supply contact is connected with the mainboard side power supply contact via the conductive strip.

Preferably, all parts of the plugboard 13 other than the conductive strip are made of an insulated material; when the plugboard 13 is pushed, the battery side power supply contact and the mainboard side power supply contact are isolated via the insulated material on the plugboard, so that the battery side power supply contact cannot be electrically connected with the mainboard side power supply contact, finally causing a battery fails to supply power to the terminal.

Preferably, when the plugboard 13 is pushed, the battery side power supply contact and the mainboard side power supply contact are in air isolation, that is, there is no contact between the battery side power supply contact and the mainboard side power supply contact, finally causing the battery fails to supply power to the terminal.

Preferably, the protection apparatus further includes a baffle disposed on the terminal, wherein the baffle is configured to keep the plugboard inside the terminal when the plugboard is being pushed.

In actual applications, the detection module 11 in the protection apparatus of a terminal can be realized by a temperature sensor, a humidity sensor, a current sensor and other detection devices in the apparatus; the driving module 12 in actual applications can be realized by a motor or a step motor in the apparatus.

Figure 2:
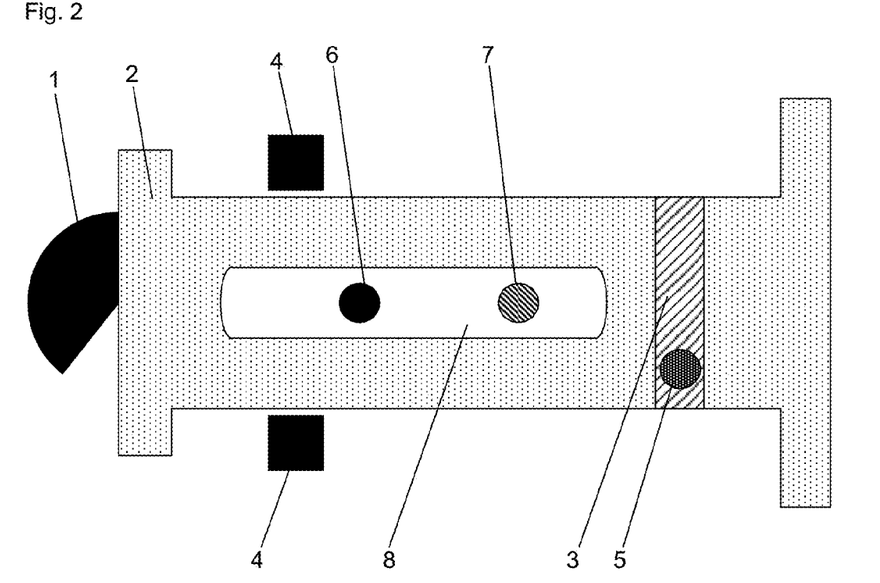
FIG. 2 is a structure front view of a protection apparatus of a terminal according to Embodiment 2 of the disclosure.

FIG. 2 is a structure front view of a protection apparatus of a terminal according to Embodiment 2 of the disclosure; as shown in FIG. 2, the protection apparatus is applied to a mobile terminal, including: a driver 1 and a plugboard 2, wherein the plugboard 2 is disposed between a mainboard side power supply contact and a battery side power supply contact of the mobile terminal; the mainboard side power supply contact and the battery side power supply contact are connected via the plugboard 2.

The driver 1 is connected with a sensor, wherein the sensor includes: a humidity sensor, a temperature sensor, a current sensor and so on; when the sensor detects that a working parameter of the mobile terminal exceeds a preset threshold, the sensor sends a driving instruction to the driver 1, the working parameter including: a humidity value, a temperature value, a current value and so on.

In this embodiment, the driver 1 is driven by a motor; when receiving the driving instruction from the sensor, the driver 1 pushes the plugboard 2 through rotation.

Preferably, the protection apparatus further includes a baffle 4, which is disposed on the mobile terminal and is used to keep the plugboard 2 inside the mobile terminal when the plugboard 2 is being pushed.

In this embodiment, the plugboard 2 is in a transverse H shape; a left edge of the plugboard 2 is used to make the plugboard 2 blocked by the baffle 4 when the plugboard 2 is being pushed, so as to prevent the plugboard 2 from being pushed out of the mobile terminal.

Figure 3:
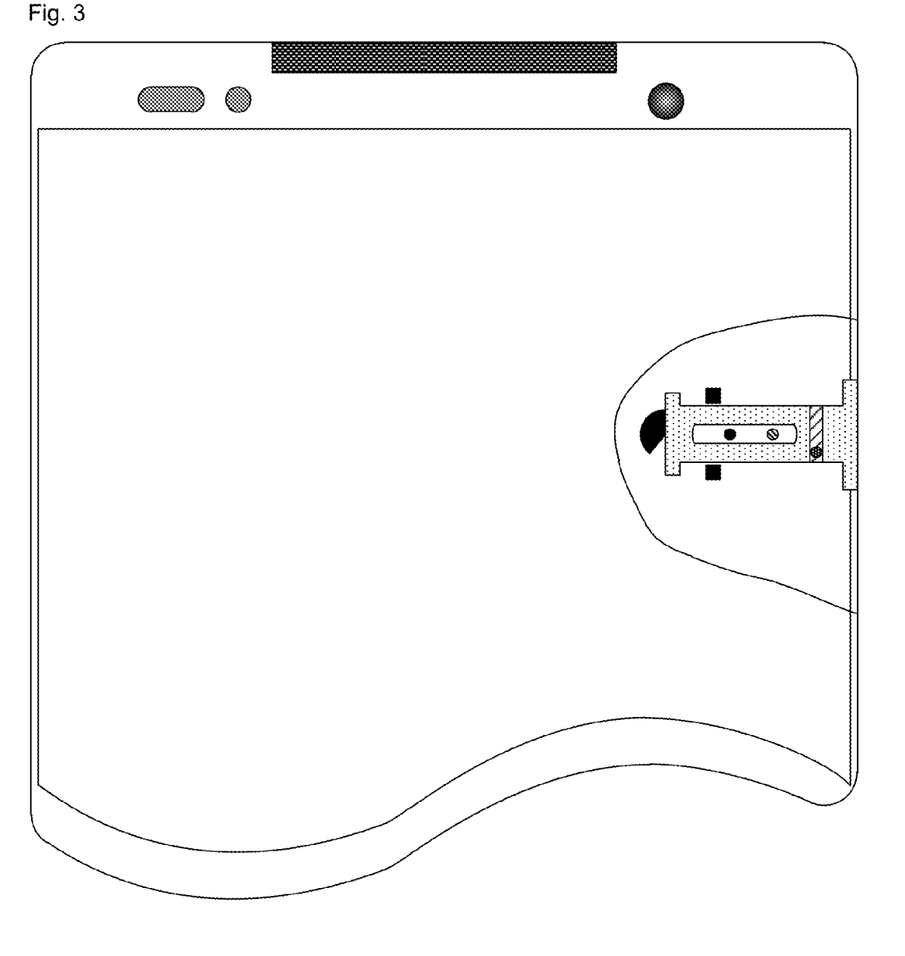
FIG. 3 is a diagram of a location of a protection apparatus of a terminal according to Embodiment 2 of the disclosure in a mobile terminal.

A right edge of the plugboard 2 is disposed on a side of the mobile terminal, as shown in FIG. 3; FIG. 3 is a diagram of a location of a protection apparatus of a terminal according to Embodiment 2 of the disclosure in a mobile terminal; this design makes the plugboard 2 manually drawable, thereby being able to cut off the power supply of the mobile terminal manually in emergencies with a normal humidity value, temperature value or current value.

Preferably, a conductive strip 3 is disposed on the plugboard 2 and runs through the plugboard 2; when the plugboard 2 is not pushed, a battery side power supply anode/cathode contact is electrically connected with a mainboard side power supply anode/cathode contact via the conductive strip 3, for supplying power to the mobile terminal; except the conductive strip 3, a rest part of the plugboard 2 is made of an insulated material; when the plugboard 2 is pushed, the battery side power supply anode/cathode contact is isolated from the mainboard side power supply anode/cathode contact via the insulated material on the plugboard 2.

Figure 4:
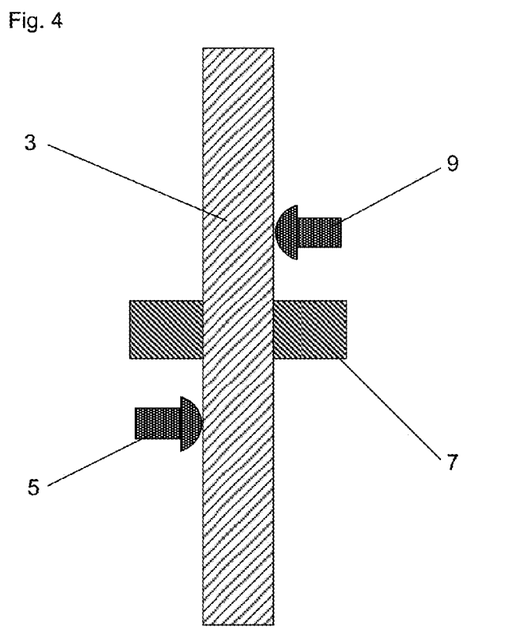
FIG. 4 is a structure right view of a protection apparatus of a terminal according to Embodiment 2 of the disclosure.

In this embodiment, the conductive strip 3 is electrically connected with the anodes; as shown in FIG. 2, a contact 5 is the battery side power supply anode contact, the mainboard side power supply anode contact is on a back of the plugboard 2; FIG. 4 is a structure right view of a protection apparatus of a terminal according to Embodiment 2 of the disclosure; as shown in FIG. 4, a contact 9 is the mainboard side power supply anode contact, the plugboard 2 is disposed between the battery side power supply anode contact 5 and the mainboard side power supply anode contact 9, the battery side power supply anode contact 5 and the mainboard side power supply anode contact 9 are electrically connected via the conductive strip 3 on the plugboard 2; here, both the battery side power supply anode contact 5 and the mainboard side power supply anode contact 9 are round contacts, for greatly reducing the abrasion to the conductive strip 3.

In this embodiment, a hollow groove 8 is disposed on the plugboard 2, so as to make a power supply cathode 6 and a power supply signal electrode 7 through connected; moreover, a distance from a edge of the hollow groove 8 to the power supply cathode 6 is greater than a distance the plugboard 2 can be pushed, so as to avoid the plugboard 2 being blocked by the power supply cathode 6 during the pushing process; as shown in FIG. 4, the power supply signal electrode 7 runs through the plugboard 2 via the hollow groove 8, the power supply cathode 6 also runs through the plugboard 2 via the hollow groove 8; if the distance from the edge of the hollow groove 8 to the power supply cathode 6 is not enough, the plugboard 2 will be blocked by the power supply cathode 6 during the pushing process, thereby impacting the effect of the apparatus cutting off the power supply of the mobile terminal.

Figure 5:
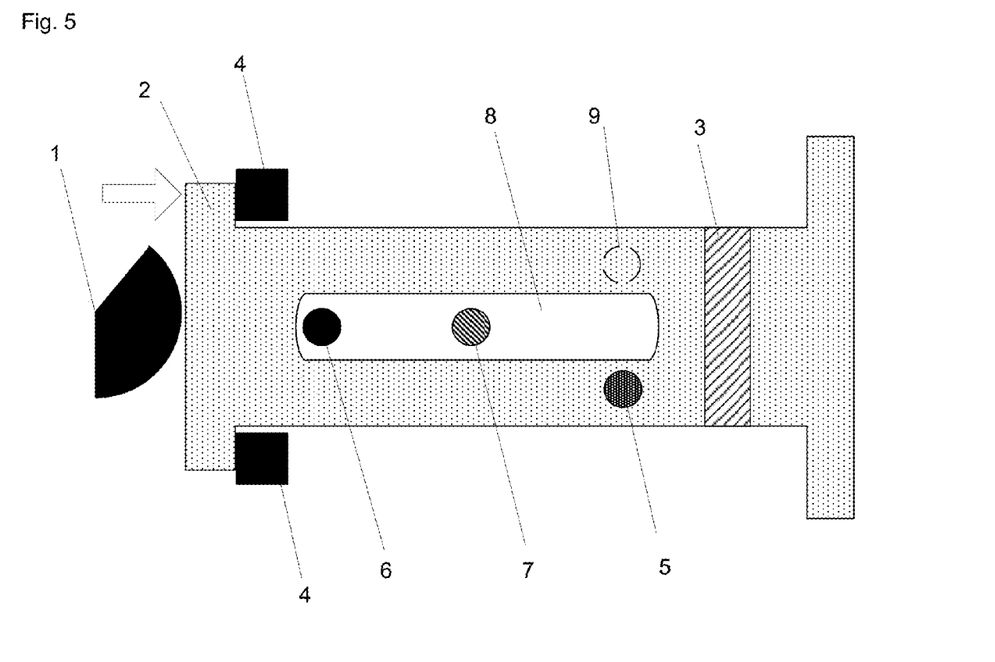
FIG. 5 is a diagram of a protection apparatus of a terminal according to Embodiment 2 of the disclosure after being pushed.

FIG. 5 is a diagram of a protection apparatus of a terminal according to Embodiment 2 of the disclosure after being pushed; as shown in FIG. 5, the driver 1 rotationally pushes the plugboard 2 under driving of a motor, the plugboard 2 moves to be blocked by the baffle 4, the conductive strip 3 disposed on the plugboard 2 moves so that the mainboard side power supply anode contact 5 and the battery side power supply anode contact 9 no longer contact the conductive strip 3, but contact the insulated material of the plugboard 2 only; since the mainboard side power supply anode contact 5 and the battery side power supply anode contact 9 cannot be electrically connected via the insulated material, the battery cannot supply power to the mobile terminal.

Figure 6:
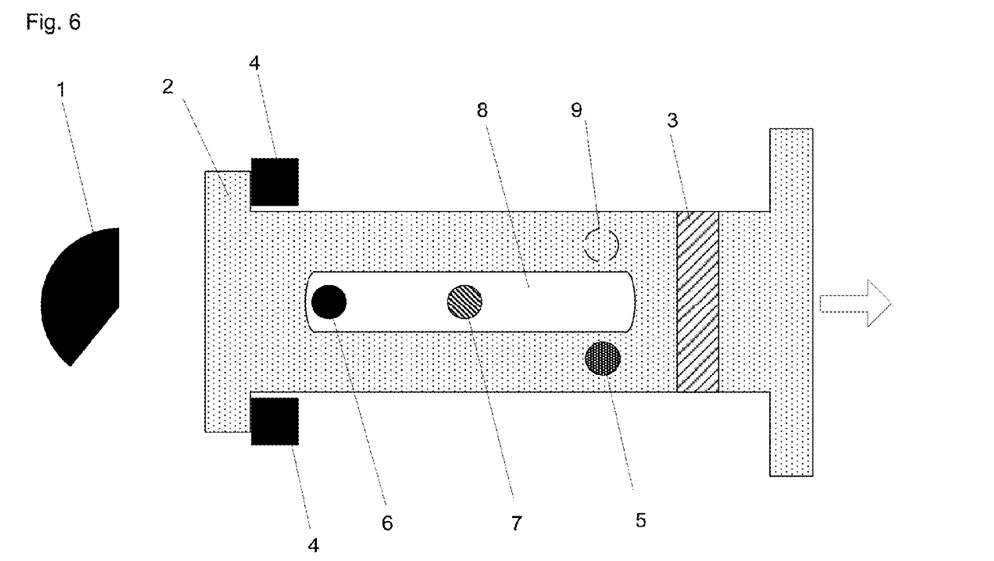
FIG. 6 is a diagram of a protection apparatus of a terminal according to Embodiment 2 of the disclosure after being manually pulled out.

FIG. 6 is a diagram of a protection apparatus of a terminal according to Embodiment 2 of the disclosure after being manually pulled out; as shown in FIG. 6, a user directly pulls out the plugboard 2 through the right edge of the plugboard 2 in emergencies, in this condition the driver 1 does not rotate, the plugboard 2 moves to be blocked by the baffle 4, the conductive strip 3 disposed on the plugboard 2 moves so that the mainboard side power supply anode contact 5 and the battery side power supply anode contact 9 no longer contact the conductive strip 3, but contact the insulated material of the plugboard 2 only; since the mainboard side power supply anode contact 5 and the battery side power supply anode contact 9 cannot be electrically connected via the insulated material, the battery cannot supply power to the mobile terminal.

Figure 7:
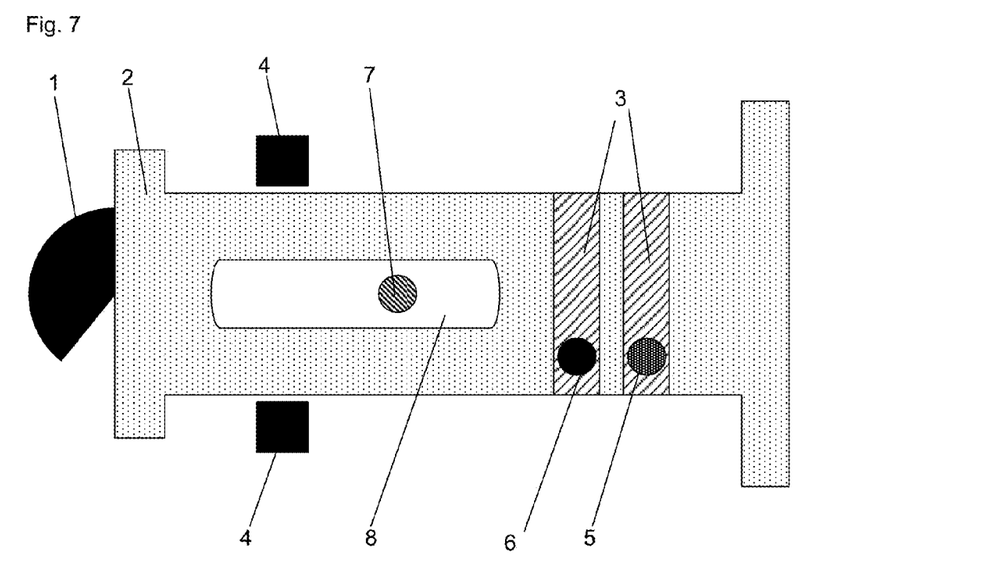
FIG. 7 is a structure front view of a protection apparatus of a terminal according to Embodiment 3 of the disclosure.

FIG. 7 is a structure front view of a protection apparatus of a terminal according to Embodiment 3 of the disclosure; as shown in FIG. 7, the protection apparatus is applied to a mobile terminal, including: a driver 1 and a plugboard 2, wherein the plugboard 2 is disposed between a mainboard side power supply contact and a battery side power supply contact of the mobile terminal; the mainboard side power supply contact and the battery side power supply contact are connected via the plugboard 2;

the driver 1 is connected with a sensor, wherein the sensor includes: a humidity sensor, a temperature sensor, a current sensor and so on; when the sensor detects that a working parameter of the mobile terminal exceeds a preset threshold, the sensor sends a driving instruction to the driver 1, the working parameter including: a humidity value, a temperature value, a current value and so on.

In this embodiment, the driver 1 is driven by a motor; when receiving the driving instruction from the sensor, the driver 1 pushes the plugboard 2 through rotation.

Preferably, the protection apparatus further includes a baffle 4, which is disposed on the mobile terminal and is used to keep the plugboard 2 inside the mobile terminal when the plugboard 2 is being pushed.

In this embodiment, the plugboard 2 is in a transverse H shape; a left edge of the plugboard 2 is used to make the plugboard 2 blocked by the baffle 4 when the plugboard 2 is being pushed, so as to prevent the plugboard 2 from being pushed out of the mobile terminal.

A right edge of the plugboard 2 is disposed on a side of the mobile terminal, so that the plugboard 2 is manually drawable, and the power supply of the mobile terminal can be cut off manually in emergencies with normal humidity value, temperature value or current value.

Preferably, two conductive strips 3 are disposed on the plugboard 2 and run through the plugboard 2; when the plugboard 2 is not pushed, a battery side power supply anode contact is electrically connected with a mainboard side power supply anode contact via one conductive strip 3, a battery side power supply cathode contact is electrically connected with a mainboard side power supply cathode contact via the other conductive strip 3, for supplying power to the mobile terminal; except the conductive strip 3, a rest part of the plugboard 2 is made of an insulated material. In FIG. 7, a battery side power supply anode contact 5 and a battery side power supply cathode contact 6 are disposed on the two conductive strips 3 respectively, while the mainboard side power supply anode contact and the mainboard side power supply cathode contact are disposed on the corresponding conductive strip 3 on a back of the plugboard 2, which are not marked in FIG. 7; the battery side power supply anode contact 5 and the battery side power supply cathode contact 6, the mainboard side power supply anode contact and the mainboard side power supply cathode contact all are round contacts, for greatly reducing the abrasion to the conductive strip 3.

In this embodiment, a hollow groove 8 is disposed on the plugboard 2, so as to make a power supply signal electrode 7 through connected; moreover, a distance from a edge of the hollow groove 8 to the power supply signal electrode 7 is greater than a distance the plugboard 2 can be pushed, so as to avoid the plugboard 2 being blocked by the power supply signal electrode 7 during pushing process; as shown in FIG. 7, the power supply signal electrode 7 runs through the plugboard 2; if the distance from the edge of the hollow groove 8 to the power supply signal electrode 7 is not enough, the plugboard 2 will be blocked by the power supply signal electrode 7 during the pushing process, thereby impacting the effect of the apparatus cutting off the power supply of the mobile terminal.

Figure 8:
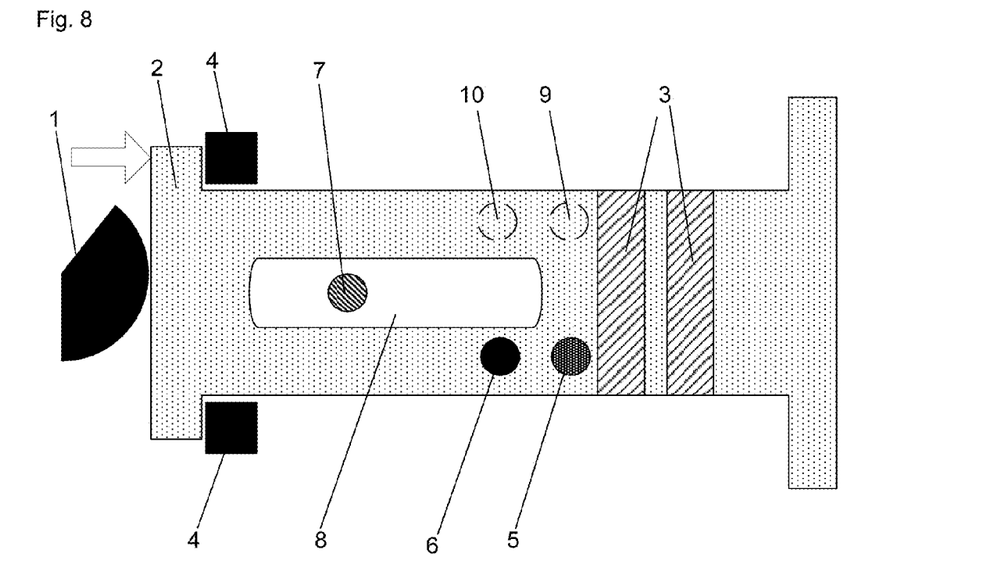
FIG. 8 is a diagram of a protection apparatus of a terminal according to Embodiment 3 of the disclosure after being pushed.

FIG. 8 is a diagram of a protection apparatus of a terminal according to Embodiment 3 of the disclosure after being pushed; as shown in FIG. 8, the driver 1 rotationally pushes the plugboard 2 under the driving of a motor, the plugboard 2 moves to be blocked by the baffle 4, the two conductive strips 3 disposed on the plugboard 2 move so that the mainboard side power supply anode contact 5 and the battery side power supply anode contact 9 no longer contact the conductive strip 3, and the battery side power supply cathode 6 and the mainboard side power supply cathode 10 no longer contact the conductive strip 3, but contact the insulated material of the plugboard 2 only; since the mainboard side power supply anode contact 5 and the battery side power supply anode contact 9 cannot be electrically connected via the insulated material and the battery side power supply cathode 6 and the mainboard side power supply cathode 10 cannot be electrically connected via the insulated material, the battery cannot supply power to the mobile terminal.

The diagram of the protection apparatus of Embodiment 2 after being manually pulled out is similar to FIG. 8; the difference lies in that a user directly pulls out the plugboard 2 through the right side of the plugboard 2 in emergencies and the driver 1 does not rotate; no further description is needed here.

Preferably, the disclosure also provides an embodiment of air isolating the battery side power supply contact from the mainboard side power supply contact when the plugboard is pushed; in this embodiment, two hollow areas are disposed on the left side of the conductive strip of the plugboard, making the hollow areas on the plugboard move to above the battery side power supply contact and the mainboard side power supply contact when the plugboard is pushed, so that the battery side power supply contact and the mainboard side power supply contact do not contact any material and cannot be electrically connected; since there is only a change on the shape of the plugboard in this embodiment and the principle is approximately the same as that of the above embodiments, no further description is needed here.

Based on the above apparatus, the embodiment of the disclosure also provides a protection method of a terminal, including: when a detection module detects that a working parameter of the terminal exceeds a preset threshold, the detection module sends a driving module a driving instruction for pushing a plugboard so as to break a connection between a mainboard side power supply contact and a battery side power supply contact; wherein the working parameter includes at least one of the following: a humidity value, a temperature value and a current value.

Preferably, the method further includes: when the plugboard is not pushed, the battery side power supply contact is electrically connected with the mainboard side power supply contact via a conductive strip disposed on the plugboard.

Preferably, the breaking the connection between the mainboard side power supply contact and the battery side power supply contact includes:

the driving module pushes the plugboard, so as to isolate the battery side power supply contact from the mainboard side power supply contact via an insulated material on the plugboard other than the conductive strip, thereby to break the connection between the mainboard side power supply contact and the battery side power supply contact.

Preferably, breaking the connection between the mainboard side power supply contact and the battery side power supply contact includes:

the driving module pushes the plugboard, so that the battery side power supply contact and the mainboard side power supply contact are in air isolation, thereby to break the connection between the mainboard side power supply contact and the battery side power supply contact.

Figure 9:
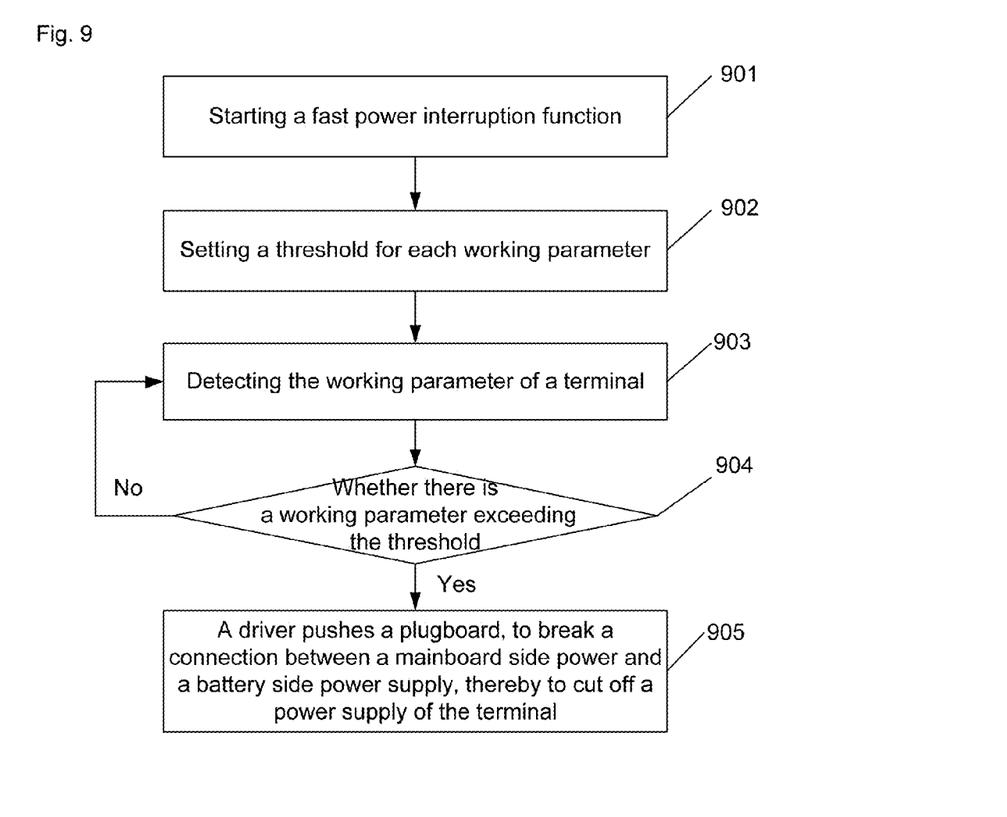
FIG. 9 is a flowchart of a protection method of a terminal according to an embodiment of the disclosure.

FIG. 9 is a flowchart of a protection method of a terminal according to the embodiment of the disclosure. As shown in FIG. 9, the method includes following steps:

Step 901: starting a fast power interruption function.

Here, whether to start the fast power interruption function can be controlled by a switch option, of which the main function is to enable a user to have the option to start, for example, when performing a terminal high-temperature or low-temperature test or waterproof test or when it is not needed to interrupt power supply rapidly, a user can select not to start the fast power interruption function through the switch option.

Step 902: setting a threshold for each working parameter.

Here, before detection, it is needed to set the threshold of each working parameter, including: a maximum humidity value, a maximum temperature value and a minimum temperature value, a maximum current value and so on.

Step 903 to step 904: detecting the working parameter of a terminal, and judging whether there is a working parameter exceeding the threshold; if so, executing step 905; otherwise, executing step 903.

Step 905: a driver pushes a plugboard, to break a connection between a mainboard side power supply and a battery side power supply, thereby to cut off a power supply of the terminal.

Here, the driver pushes the plugboard after receiving the driving instruction, making a battery side power supply anode and/or cathode and a mainboard side power supply anode and/or cathode not located on the conductive strip of the plugboard, but located on the insulated material of the plugboard, thereby achieving the purpose of cutting off power supply.

The above are only preferred embodiments of the disclosure and are not intended to limit the scope of protection of the disclosure. Any modification, equivalent substitute and improvement made within the spirit and principle of the disclosure are intended to be included within the scope of protection of the disclosure.

INDUSTRIAL APPLICABILITY

By detecting a working parameter of a terminal, an embodiment of the disclosure pushes a plugboard to break a connection between a mainboard side power supply contact and a battery side power supply contact when detecting the working parameter exceeds a preset threshold; in this way, the disclosure on one hand realizes the fast power interruption of a mobile terminal in emergencies by a physical method, effectively reduces the damage to the mobile terminal in an emergency and reduces the loss of a user; and on the other hand the disclosure can realize the fast power interruption of a mobile terminal manually, so as to rapidly cut off power supply when the mobile terminal is crashed and cannot be powered off, thereby improving user experience.

The invention claimed is:

1. A protection apparatus of a terminal, comprising: a detection module, a driving module and a plugboard, wherein the plugboard is disposed between a mainboard side power supply contact and a battery side power supply contact of the terminal; the mainboard side power supply contact and the battery side power supply contact are connected via the plugboard; wherein the detection module is configured to send a driving instruction to the driving module when detecting that a working parameter of the terminal exceeds a preset threshold; and the driving module is configured to push the plugboard so as to break a connection between the mainboard side power supply contact and the battery side power supply contact when receiving the driving instruction sent from the detection module;

wherein a conductive strip is disposed on the plugboard; when the plugboard is not pushed, the battery side power supply contact is electrically connected with the mainboard side power supply contact via the conductive strip;

wherein all parts of the plugboard except the conductive strip are made of an insulated material; when the plugboard is pushed, the battery side power supply contact and the mainboard side power supply contact are isolated via the insulated material of the plugboard.

2. The protection apparatus according to claim 1, wherein when the plugboard is pushed, the battery side power supply contact and the mainboard side power supply contact are in air isolation.

3. The protection apparatus according to claim 1, further comprising: a baffle disposed on the terminal, wherein the baffle is configured to keep the plugboard inside the terminal when the plugboard is being pushed.

4. The protection apparatus according to claim 1, wherein the working parameter comprises at least one of the following: a humidity value, a temperature value and a current value.

5. A protection method of a terminal, comprising:

when a detection module detects that a working parameter of the terminal exceeds a preset threshold, sending, by the detection module, a driving instruction to a driving module for pushing a plugboard so as to break a connection between a mainboard side power supply contact and a battery side power supply contact;

when the plugboard is not pushed, electrically connecting the battery side power supply contact with the mainboard side power supply contact via a conductive strip disposed on the plugboard;

wherein the breaking the connection between the mainboard side power supply contact and the battery side power supply contact comprises: pushing the plugboard by the driving module, so as to isolate the battery side power supply contact from the mainboard side power supply contact via an insulated material of the plugboard other than the conductive strip, thereby to break the connection between the mainboard side power supply contact and the battery side power supply contact.

6. The protection method according to claim 5, wherein the breaking the connection between the mainboard side power supply contact and the battery side power supply contact comprises:

pushing the plugboard by the driving module, so that the battery side power supply contact and the mainboard side power supply contact are in air isolation, thereby to break the connection between the mainboard side power supply contact and the battery side power supply contact.

7. The protection method according to claim 5, further comprising:

when the plugboard is being pushed, keep, by a baffle disposed on the terminal, the plugboard inside the terminal.

8. The protection method according to claim 5, wherein the working parameter comprises at least one of the following: a humidity value, a temperature value and a current value.

9. The protection apparatus according to claim 1, wherein the mainboard side power supply contact comprises a mainboard side power supply anode contact and a mainboard side power supply cathode contact; and the battery side power supply contact comprises a battery side power supply anode contact and a battery side power supply cathode contact.

10. The protection method according to claim 5, wherein the mainboard side power supply contact comprises a mainboard side power supply anode contact and a mainboard side power supply cathode contact; and the battery side power supply contact comprises a battery side power supply anode contact and a battery side power supply cathode contact.

* * * * *